(12) United States Patent
Ho

(10) Patent No.: US 11,713,032 B1
(45) Date of Patent: Aug. 1, 2023

(54) DIRECTION CONTROL DEVICE FOR HOVERCRAFT

(71) Applicant: Patrick Ho, Rochester, NY (US)

(72) Inventor: Patrick Ho, Rochester, NY (US)

( * ) Notice: Subject to any disclaimer, the term of this patent is extended or adjusted under 35 U.S.C. 154(b) by 0 days.

(21) Appl. No.: 17/713,930

(22) Filed: Apr. 5, 2022

(51) Int. Cl.
*B60V 1/11* (2006.01)

(52) U.S. Cl.
CPC ................... *B60V 1/115* (2013.01)

(58) Field of Classification Search
CPC ..................................... B60V 1/115
See application file for complete search history.

(56) References Cited

U.S. PATENT DOCUMENTS

| | | | | |
|---|---|---|---|---|
| 3,372,664 A | * | 3/1968 | David | B60V 1/16 114/67 A |
| 3,700,064 A | * | 10/1972 | Richardson | B60V 1/043 180/117 |
| 3,763,957 A | * | 10/1973 | Hunt | B60V 1/115 301/5.1 |
| 4,175,636 A | * | 11/1979 | Broughton | B60V 1/16 180/127 |
| 4,416,346 A | * | 11/1983 | Logan | B60V 1/14 180/127 |

FOREIGN PATENT DOCUMENTS

FR 2937903 A1 * 5/2010 ............ B60F 3/0038

\* cited by examiner

*Primary Examiner* — Kevin Hurley
(74) *Attorney, Agent, or Firm* — Brown & Michaels, PC

(57) ABSTRACT

A direction control device includes a housing, a wheel shaft supported by the housing, a wheel supported by the wheel shaft, a blade shaft supported by the housing, and a blade mounted on the blade shaft. The housing has a first side and a longitudinal axis. The wheel shaft has a wheel axis and is configured to extend beyond the first side outside the housing. The wheel has a rotational axis and is configured to rotate about the rotational axis. The blade shaft is configured to extend beyond the first side outside the housing.

31 Claims, 17 Drawing Sheets

DIRECTION CONTROL DEVICE FOR HOVERCRAFT

BACKGROUND OF THE INVENTION

Field of the Invention

The invention pertains to the field of hovercraft, and more particularly, to a direction control device for hovercraft.

Description of Related Art

Hovercraft, also known as air-cushion vehicles, are amphibious craft capable of traveling over land, water, mud, ice, and other surfaces. Hovercraft produce a large volume of fluid (typically air), or fluid cushion, below the hull and contained by a flexible skirt attached to the sides of the craft. An engine or a compressor pushes the fluid below the craft to achieve a sufficient pressure capable of supporting the weight of the craft, lifting the hovercraft a short hovering height above a surface. While hovering above the surface, supported by fluid, the hovercraft experiences relatively low friction during movement such that the hovercraft can be propelled with relatively little force, as compared to other types of vehicles of similar size. Taking advantage of the minimal propulsion requirements, hovercraft models are known in the art to be of a wide range of sizes, ranging from single-seat vehicles to high-capacity ferries and cargo vehicles.

Because hovercraft can seamlessly transition between land and water, hovercraft are desirable for travel over rugged or mixed terrain, such as marshes, lakes and rivers, coastlines, muddy terrain, ice, snow, or other terrain over which transportation by wheeled vehicles is impractical. Hovercraft are desirable in these types of terrain for time sensitive applications, such as first aid and rescue. Hovercraft are also used extensively for military applications to amphibiously move substantial weight, such as to transport and land personnel, armored vehicles, and other equipment.

Unfortunately, because conventional hovercraft travel without contacting the underlying surface, hovercraft fail to exhibit the type of directional control seen in pure land vehicles or pure water vehicles. Land vehicles, for example, can change direction by changing the orientation of tires or wheels in direct contact with the land. Water vehicles can change direction by changing the direction of a rudder extending into the water from the vehicle. Hovercraft, on the other hand, change direction of travel by changing the direction at which the propelling force is applied. Typically, a fan or other device at a rear end of the hovercraft propels the hovercraft, such that changing the direction of the craft's forward movement requires turning the propelling device to spin the rear end until the craft faces a direction of desired travel, and then reorienting the propelling device to add force in a direction opposite the front of the craft. Aligning the craft in the desired direction is not easy, especially because the craft continues to slide along its previous line of travel as the propelling device rotates the craft to face a new desired direction, and because the rear end of the craft continues to slide in an arc across a relatively long distance unless the propelling device is turned to provide a counterforce to stop the rotation of the craft's rear end. Accordingly, to adjust to a newly desired line of travel, the craft is over-rotated initially and then brought back to align in the direction of desired travel. Similarly, to enact a controlled stop of a conventional hovercraft's forward motion, an operator can rotate the entire hovercraft 180 degrees to point the propelling device opposite the direction of travel, or the operator can decrease hovering thrust to slow the hovercraft to a stop by frictional contact with the surface. The complexity and imprecision of these maneuvers renders hovercraft difficult and unsafe to operate in confined spaces, such as between buildings or other vehicles, and on dangerous terrain, such as near cliffsides and ravines.

Complicating direction control, wind strongly affects hovercraft, and operators must assert greater effort steering to compensate for unintended directional changes due to wind. Even when stationary, operators must work harder against wind than pure water craft or pure land vehicles to remain stationary.

Further, generating the fluid cushion required to keep hovercraft aloft is costly in terms of efficiency per distance traveled. Hovercraft are therefore mostly used for short distance applications where amphibious capabilities and high versatility are desirable, while they are rarely practical or useful for long distance travel, even when travel over different surfaces is involved.

SUMMARY OF THE INVENTION

A direction control device for a hovercraft enables improved control over the directional movement of a hovercraft.

In some embodiments, a direction control device includes a housing, a wheel shaft supported by the housing, a wheel supported by the wheel shaft, a blade shaft supported by the housing, and a blade mounted on the blade shaft. The housing has a first side and a longitudinal axis. The wheel shaft has a wheel axis and is configured to extend beyond the first side outside the housing. The wheel has a rotational axis and is configured to rotate about the rotational axis. The blade shaft is configured to extend beyond the first side outside the housing.

In some embodiments, a hovercraft includes a bottom wall with a central longitudinal axis, a passenger side to a first side of the bottom wall, a wheel shaft configured to extend from the bottom wall to a second side of the bottom wall opposite the passenger side and configured to retract through the bottom wall to the passenger side, a wheel rotatably mounted on the wheel shaft, a blade shaft configured to extend from the bottom wall to the second side of the bottom wall and configured to retract through the bottom wall to the passenger side, and a blade mounted on the blade shaft.

DETAILED DESCRIPTION OF THE INVENTION

Figure 1:
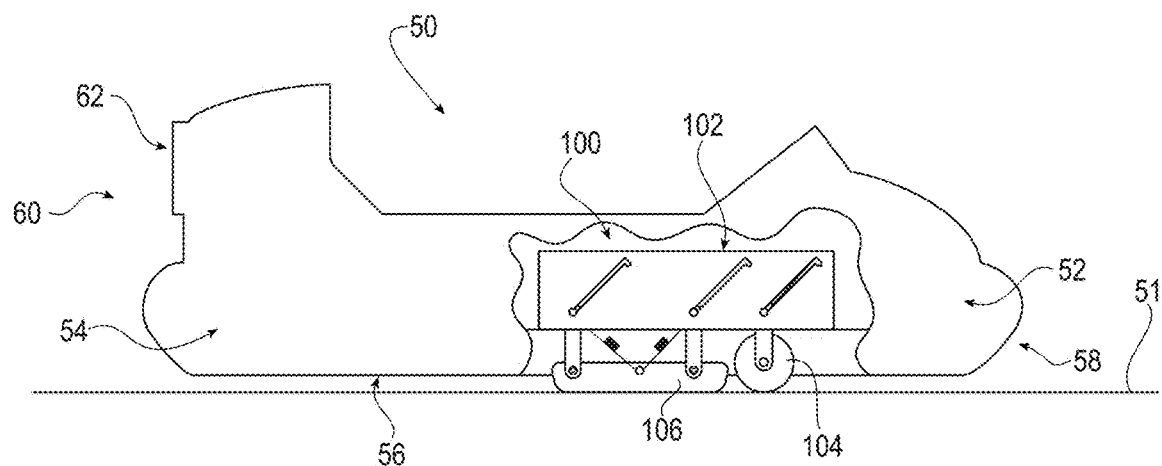
FIG. 1 shows a side view of a hovercraft partially cut away to reveal a direction control device with a wheel and a blade in a first position, according to an embodiment of the invention.

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terms "approximately" and "about", when qualifying a quantity, shall mean the quantity with a tolerance plus or minus 10 percent of the quantity, unless otherwise specified.

Figure 2:
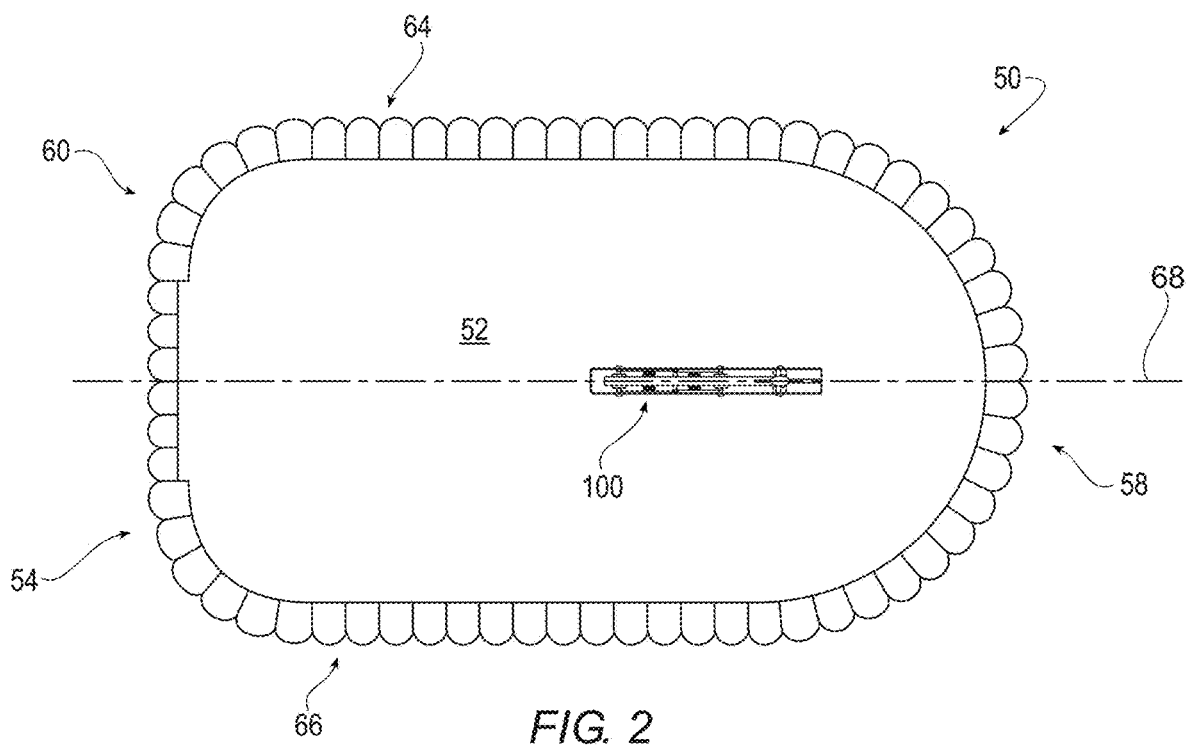
FIG. 2 shows a bottom view of a hovercraft including the direction control device of FIG. 1.

As discussed above, a direction control device disclosed herein improves directional control of a hovercraft over land, water, or any other surface over which hovercraft travel. FIG. 1 shows a side view of a hovercraft 50 partially cut away to reveal a direction control device 100, according to an embodiment of the invention. The direction control device 100 can be implemented with minimal or no modification in a great variety of now-known or future-developed hovercrafts. FIG. 2 shows a bottom view of the hovercraft 50. Referring to FIG. 1 and FIG. 2, the hovercraft 50 has a frame or floor 52, a skirt 54 at a bottom side 56, a front end 58, a rear end 60, and a propelling device 62 at the rear end 60. The hovercraft 50 includes the direction control device 100 centered between a left lateral side 64 and a right lateral side 66 to provide symmetrical steering toward the left lateral side 64 and the right lateral side 66, though the direction control device 100 could be positioned alternatively, as desired, in part depending on the arrangement of the particular hovercraft. The left lateral side 64 can be to, at, or toward a port side of the hovercraft 50, the right lateral side 66 can be to, at, or toward a starboard side of the hovercraft 50, the front end 58 can be to, at, toward, or inclusive of a bow of the hovercraft 50, and the rear end 60 can be to, at, toward, or inclusive of a stern of the hovercraft 50.

Multiple direction control devices 100 can be used with a single hovercraft. For example, a relatively wide hovercraft can have multiple direction control devices 100 positioned symmetrically on either side of a center axis 68 between the left lateral side 64 and the right lateral side 66. The direction control device 100 can be positioned as desired between the front end 58 and the rear end 60, though with the propelling device 62 thrusting from the rear end 60, positioning the direction control device 100 toward or in the front half of the hovercraft 50 can yield greater direction control. The direction control device 100 can extend from or about from the front end 58 to or about to a middle point 70 between the front end 58 and the rear end 60. A longer direction control device 100 can provide more uniform and stable control, while a shorter direction control device 100 can yield sharper turning and greater agility.

The direction control device 100 includes a housing 102 to support and interconnect various other components of the direction control device 100, as well as to attach or fasten to the hovercraft 50. The housing 102 can be fastened to a floor or frame 52 of the hovercraft 50 by various now-known or future developed means.

Figure 3:
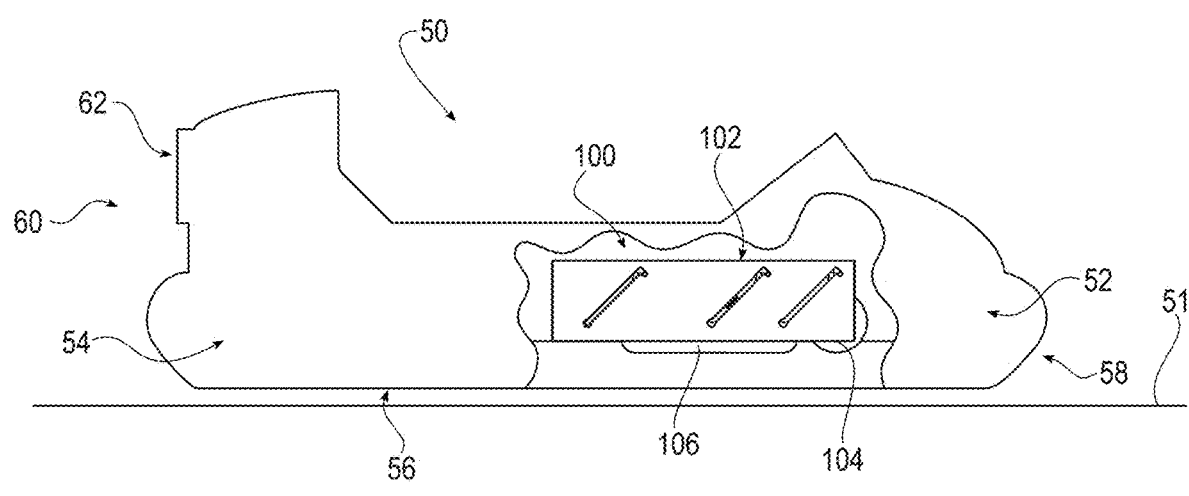
FIG. 3 shows a side view of the hovercraft partially cut away to reveal the direction control device of FIG. 1 with the wheel and the blade in a second position.
Figure 4:
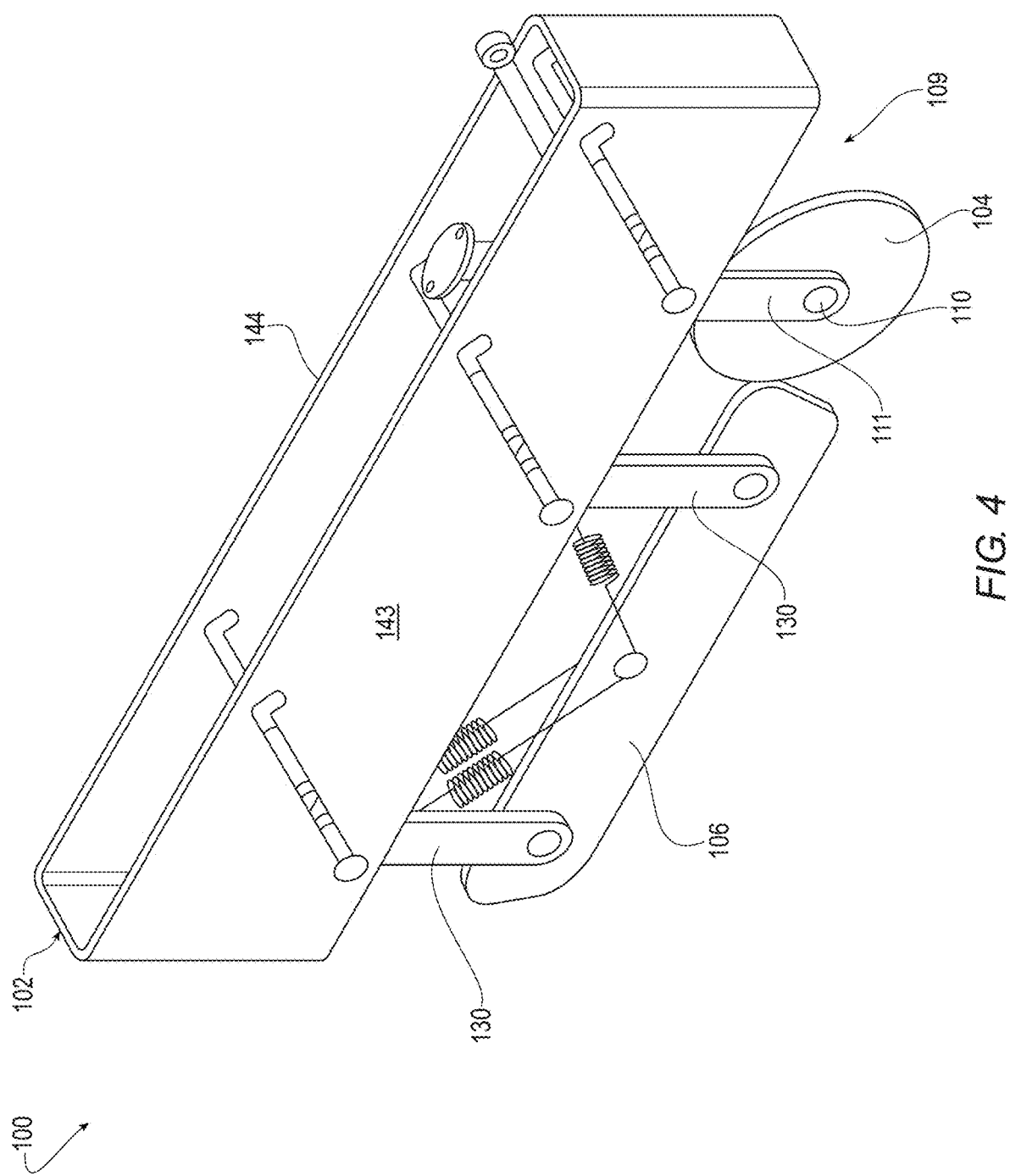
FIG. 4 shows a perspective view of the direction control device of FIG. 1 with the wheel and the blade in the first position.
Figure 5:
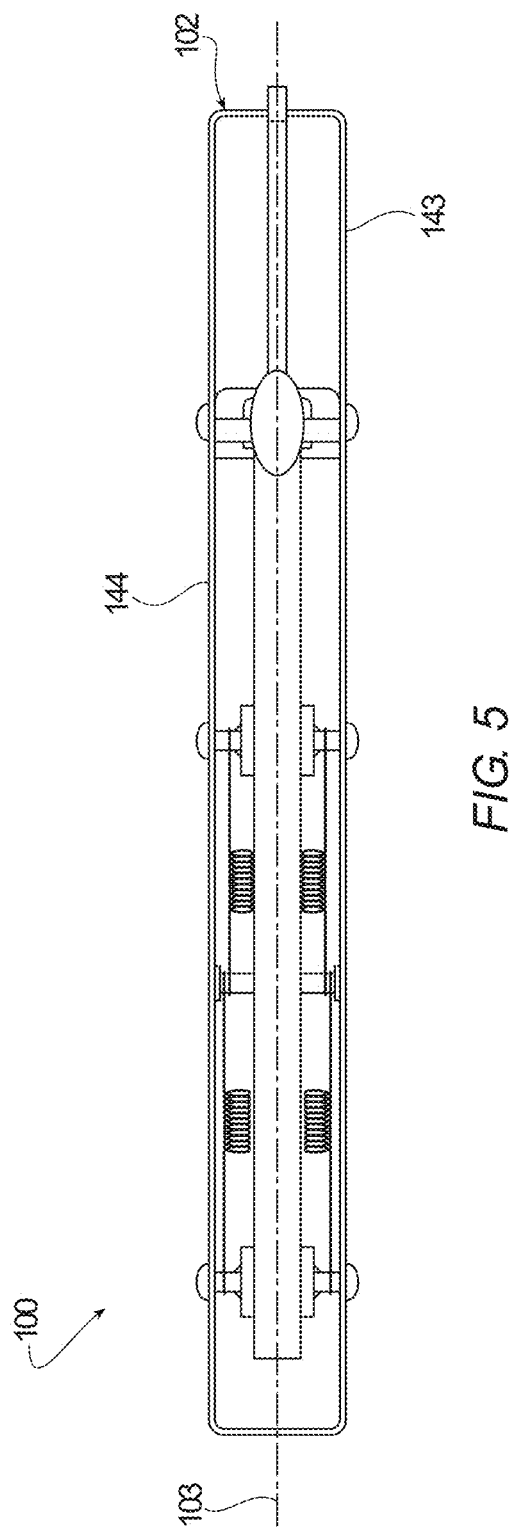
FIG. 5 shows a top view of the direction control device of FIG. 1.
Figure 6:
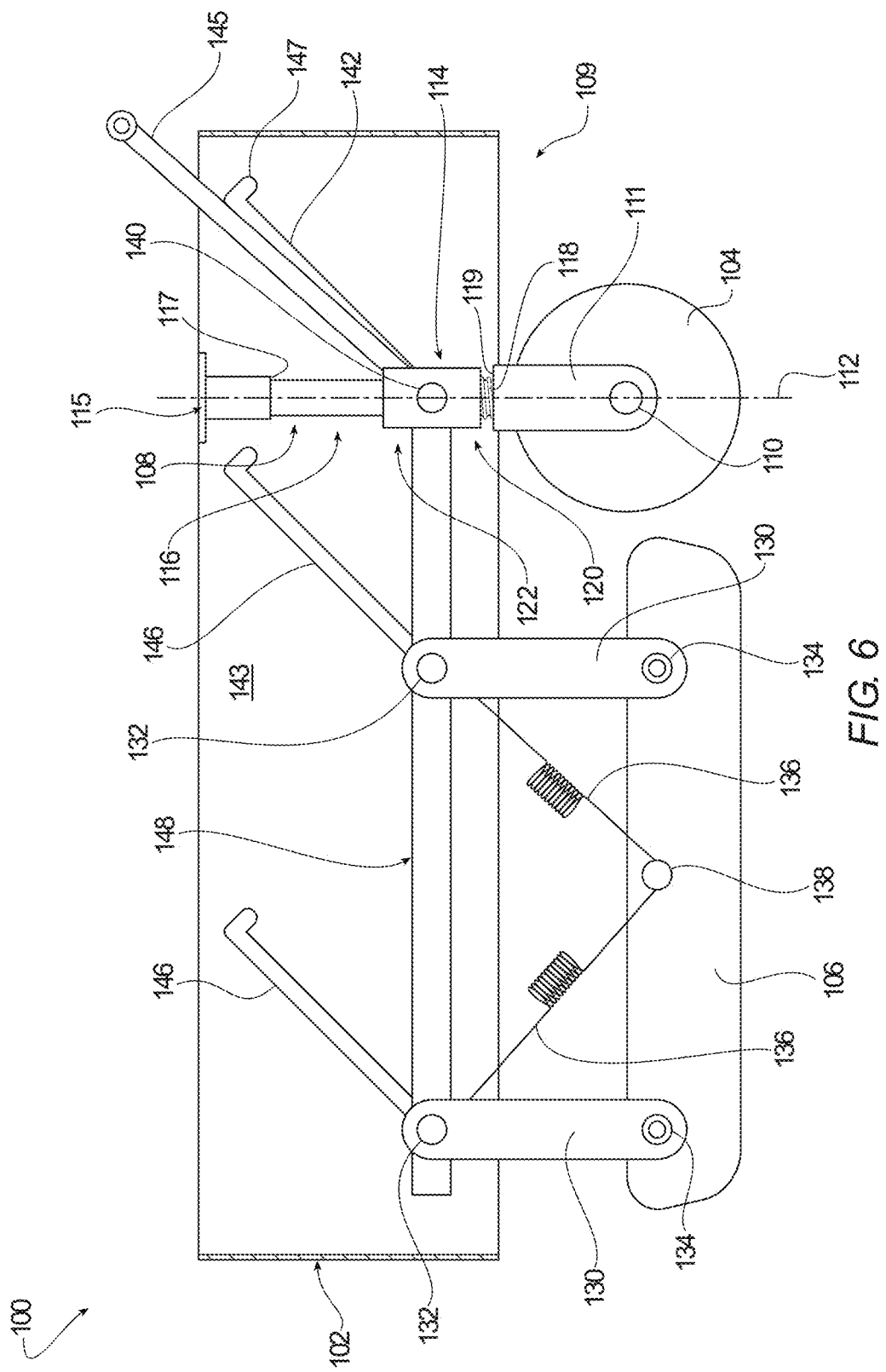
FIG. 6 shows a side view of the direction control device of FIG. 1 with the housing sectioned to reveal components within the housing and with the wheel and the blade in the first position.
Figure 7:
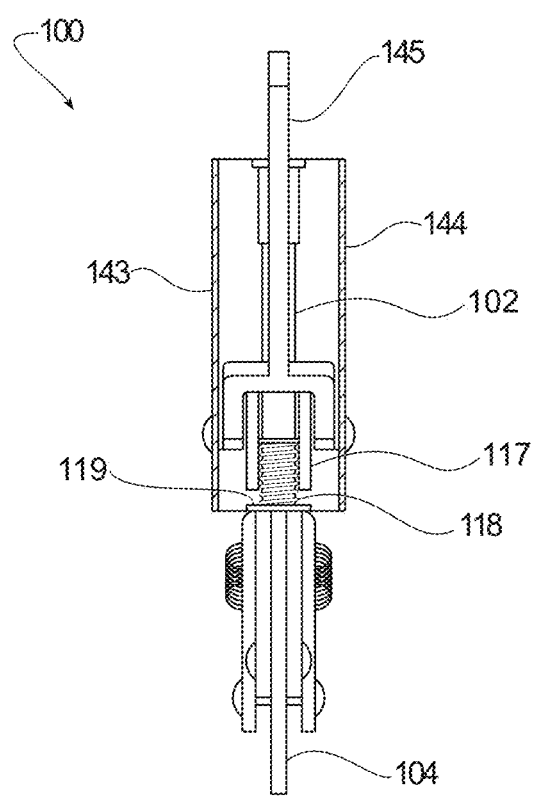
FIG. 7 shows a front view of the direction control device of FIG. 1 with the housing sectioned to reveal components within the housing and with the wheel and the blade in the first position.

The housing 102 can be shaped variously, though in the illustrated embodiment, the housing is elongated, with a longitudinal axis 103, to minimize its volume or footprint while accommodating configuration of a wheel 104 and a blade 106. The wheel 104 can selectively contact a surface, such as solid surface 51, over which the hovercraft 50 travels, e.g., by being extended or retracted between a first position (extended) and a second position (retracted), to add rolling friction or sliding friction between the hovercraft 50 and the surface. The blade 106 can also selectively contact a surface over which the hovercraft 50 travels, e.g., by being extended or retracted between the first position (extended) and the second position (retracted), to add sliding friction between the hovercraft 50 and the surface, or to add directional resistance of movement of the hovercraft 50 against a surface medium. In the first position, the wheel 104 and the blade 106 can be considered to be extended out or away from the housing 102, while in the second position, the wheel 104 and the blade 106 can be considered to be retracted from the extended, first position toward or into the housing 102. FIG. 1 shows the wheel 104 and the blade 106 each in the first position, while FIG. 3 shows the wheel 104 and the blade 106 each in the second position. The wheel 104 and the blade 106 can be configured in various embodiments to be independently or simultaneously moved between the first position and the second position. The length of travel of the wheel 104 and the blade 106 between the first position and the second position can vary depending on the hovercraft in which the direction control device 100 is installed, and the hovering height between a surface and the direction control device 100. For example, referring to FIG. 1 and FIG. 3, in hovercraft 50, which can hover about eight or nine inches above a surface, the wheel 104 and the blade 106 can extend beyond the floor 52 of the hovercraft 50 about 12-15 inches, in the first position, to reach fully into a liquid surface. When the wheel 104 and the blade 106 retract to the second position, the wheel 104 and the blade 106 move fully out of the surface and can further retract partially or fully into the housing 102.

A closer view of the direction control device 100, including the configuration of the wheel 104 and the blade 106, can be seen in FIGS. 4-7, which include a perspective view, a top view, a side view with the housing 102 sectioned to reveal components within the housing 102, and a front view of the direction control device 100 with the wheel 104 and the blade 106 each in the first position and the housing 102 sectioned to reveal components within the housing 102. Referring to FIGS. 4-7, the wheel 104 is in the shape of a flat, thin disc in part such that the disc can roll over solid surfaces while minimizing the resistance that the wheel 104 causes against the direction of travel of the hovercraft 50.

The wheel 104 is mounted rotatably on a wheel shaft 108 that is supported by the housing 102, and that extends beyond a first side 109 of the housing 102. An axle or bearing 110 can connect the wheel 104 to the wheel shaft 108, which can include a forked portion 111 to straddle the wheel 104 and connect to two ends of the bearing 110. The first side 109 of the housing 102 faces generally or approximately in the same direction as the bottom side 56 of the hovercraft 50. The wheel 104 is rotatable such that the wheel 104 can contact a solid or quasi-solid surface and roll over the surface, helping to stabilize alignment and travel along a straight, forward route. Further, if a change in direction of the hovercraft 50 is desired, when the propelling device 62 is rotated to change the direction of thrust, the wheel 104 can act as a pivot point to prevent or reduce sliding or drifting of the entire hovercraft 50 sideways. The rear end 60 of the hovercraft 50 can rotate around the wheel 104 to make a quicker turn in a shorter area of travel.

The wheel shaft 108, as discussed above, extends from the wheel 104 toward the bottom side 56 or floor 52 of the hovercraft 50 and connects to the housing 102 in a manner such that the wheel shaft 108 can be rotated on wheel shaft axis 112. Accordingly, the wheel shaft 108 and the wheel 104 can be rotated to further steer the hovercraft in a desired direction when travelling over a solid or quasi solid surface, for example, without changing the direction of the propelling device 62 and thrust. The orientation of the propelling device 62 can additionally be adjusted in coordination with the orientation adjustment of the wheel 104 to facilitate turning of the hovercraft 50. For example, the propelling device 62 can rotate a similar or equal amount as the wheel 104, in an opposite direction, to provide thrust into the turn directed by the wheel 104. Further, the ability to rotate the wheel around the wheel shaft axis 112 enables the wheel 104 to act as a forward rudder when the hovercraft 50 travels over liquid.

To achieve the rotatable connection of the wheel shaft 108 to the housing 102, the housing 102 can include a sleeve 114 through which the wheel shaft 108 extends. At least a first portion 116 of the wheel shaft 108 has an outermost diameter smaller than an innermost diameter of the sleeve 114, such that this first portion 116 can rotate within the sleeve 114. A steering element 115 can be attached to an end of the wheel shaft 108, to facilitate manual rotation of the wheel shaft 108 and wheel 104 by an operator. The steering element 115 can include, but not be limited to, a steering wheel, a steering handle, a joystick, or a handlebar. Referring to FIGS. 1 and 3, the propelling device 62 can thrust at a variable angle, which can be controlled manually or electronically in coordination with the direction control device 100 to achieve optimal or desired direction control.

To limit movement of the wheel shaft 108 along wheel shaft axis 112 with respect to the sleeve 114, a stop surface can be configured on either end of the sleeve 114. The stop surface has a diameter or width greater than the innermost diameter of the sleeve 114 and less than an outermost diameter of the sleeve 114, such that the stop surface on either end of the sleeve 114 is configured to abut or stop against the sleeve 114. In the depicted embodiment, the steering element 115 can include a first stop surface 117 with a greater outer diameter than the innermost diameter of the sleeve 114, to limit movement of the wheel away from the housing 102 and sleeve 114. A shock absorption element 118 between the forked portion 111 of the wheel shaft 108 and a first end 120 of the sleeve 114 can include a second stop surface 119 with an outer diameter or width greater than the innermost diameter of the sleeve 114, thereby limiting movement of the wheel 104 toward the sleeve 114. The forked portion 111 of the wheel shaft 108 can also stop against a second end 122 of the sleeve 114.

The shock absorption element 118, biasing the wheel shaft 108 and the wheel 104 away from the floor 52 of the hovercraft 50 toward the surface over which the hovercraft 50 travels, can also be deformed, resiliently deformed, or elastically deformed to provide shock absorption in response to impacts of the wheel 104 against solid surfaces, such as might be experienced travelling over uneven terrain or transitioning from a liquid to a solid surface. In the depicted embodiment, the shock absorption element 118 includes a coil spring positioned around the wheel shaft 108, though hydraulic shock absorbers or other now-know or future-developed shock absorbers can be used.

While the wheel 104 can be turned to steer the hovercraft 50 and can utilize rolling friction to steer over solid or quasi-solid surfaces, the blade relies on sliding friction and reactive forces to stabilize course direction, orientation, and/or position. While travelling above water or other fluid, the blade 106 can extend into the fluid to provide resistance to drifting and turning, thereby stabilizing the hovercraft 50 and facilitating course maintenance. For example, if a traverse gust of wind pushes on the hovercraft 50 from a side, fluid into which the blade 106 is submerged exerts a reactive force against the blade 106 in the opposite direction of the force exerted by the wind, thereby slowing movement of the hovercraft 50 caused by the wind. This reactive force helps to reduce the effect that traverse winds have on the course of the hovercraft 50. The blade 106 can be any desired shape. A flat, thin plate can provide resistance to lateral forces that would cause undesired drifting or turning, while minimizing resistance of the blade 106 in a desired forward direction of travel.

The blade 106 is mounted on at least one blade shaft 130. In the illustrated embodiment, two blade shafts 130 support the blade 106 to provide better stability and strength. The blade shafts 130 are supported by, and extend from, the housing 102. To dampen the effect of impacts and stress on the blade 106, and to provide flexibility for the blade to travel on solid or quasi solid surfaces, the blade shafts 130 can be pivotably coupled to both the housing 102 and the blade 106. A first bearing or pin 132 can extend through each blade shaft 130 and connect to the housing 102, and a second bearing or pin 134 can extend through the blade shaft 130 and the blade 106. Because the blade shafts 130 can pivot both around the first pins 132 and the second pins 134, the blade 106 can swing along its length in reaction to impacts and stress caused by irregular surfaces.

A suspension element 136 can be connected between each first bearing or pin 132 and a suspension connection element 138 located approximately equidistantly on the blade 106 between each blade shaft 130. Two pair of suspension elements 136 can be positioned—one on either broad side of the blade 106. The suspension elements 136 can be tensioned with equal force, biasing the blade 106 to a central and/or level position where the blade shafts 130 are approximately perpendicular to the blade 106 and/or where the suspension connection element 138 is equidistant between the blade shafts 130. The suspension elements 136 of the blade 106 dampen the effect of impacts and stress on the blade 106. Additionally, when travelling over land, the suspension elements 136 of the blade 106 flex the blade 106 against land surfaces to maintain surface area contact, facilitating sliding friction and course stability. The suspension elements 136 are shown as springs but could be replaced with other hydraulic tensioners or other now-known or future-developed suspension structures to bias the blade 106 to an equilibrium position.

Figure 8:
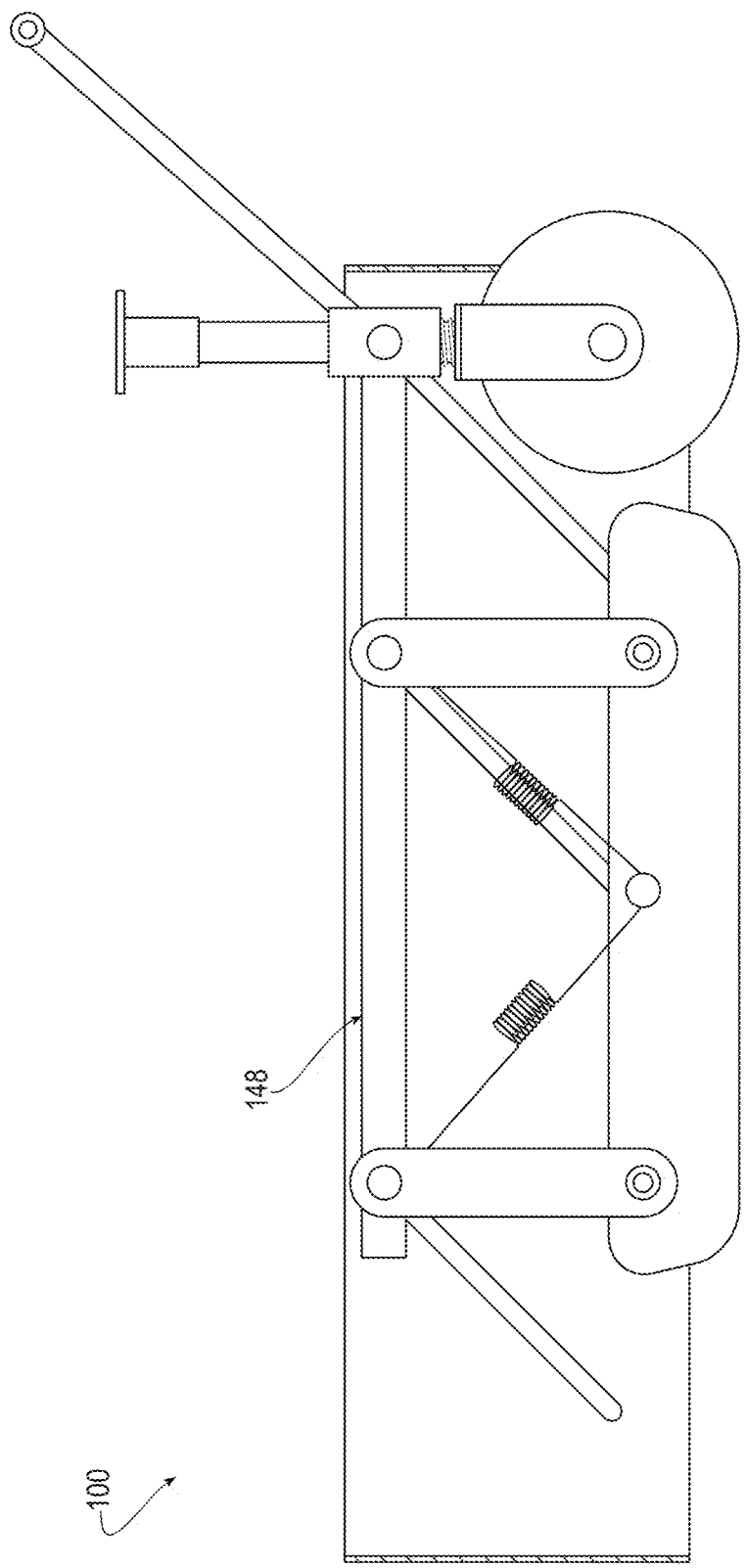
FIG. 8 shows a side view of the direction control device of FIG. 1 with the housing sectioned to reveal components within the housing and with the wheel and the blade in a second position.

FIGS. 4-7 show the direction control device 100 with the wheel 104 and the blade 106 in a first position, extended for use. By contrast, FIG. 8 illustrates the direction control device with both the wheel 104 and the blade 106 in a second position, retracted for non-use. Such that the wheel 104 can be moved between the first position and the second position, the wheel shaft 108 and the sleeve 114 are connected to the housing 102 by a third pin 140, which engages and slides in a first slot 142 defined in a first lateral side 143 of the housing 102. The first slot 142 can be mirrored on an opposing lateral side 144 of the housing 102. A handle or lever 145 can be used to manually move the third pin 140 in the slot to move the sleeve 114, the wheel shaft 108, and the wheel 104 between the first position and the second position. When the wheel 104 and the blade 106 are moved into the second position, the third pin 140 can be moved into a retaining portion 147 (shown, e.g., in FIG. 6) of the first slot 142 to prevent the wheel 104 and the blade 106 from moving (i.e., falling) back into the first position. The retaining portion 147 of first slot 142 can include a retaining element or characteristic, such as an inclination toward the first side 109 of the housing 102.

Similarly, such that the blade 106 can be moved between the first position and the second position, each first pin 132 pivotably connecting each respective blade shaft 130 to the housing 102 extends into a second slot 146 defined in the first lateral side 143 of the housing 102. Each second slot 146 can be mirrored on the opposing lateral side 144 of the housing 102. Each first pin 132 can be moved within the respective second slot 146 to move the blade 106 and the blade shafts 130 between the first position and the second position.

Alternatively, the steering of the wheel 104, and/or the movement of the wheel 104 and/or the blade 106 between the first position and the second position can be electrically powered and electronically controlled.

Referring to FIGS. 4-8, a coupling element 148 can connect any plurality of blade shafts 130 and/or plurality of first pins 132, such that the plurality of blade shafts 130 can be moved in unison, and such that the blade 106 can be moved levelly. In the illustrated embodiment, the coupling element 148 also connects to the sleeve 114, such that the wheel 104 can also be moved between the first position and the second position in unison with each blade shaft 130 and the blade 106, and such that the handle or lever 145 can be used to manually move the blade 106. The coupling element 148 can be disjointed to disconnect the inner sleeve 114 and wheel 104 from the blade 106, though, and an additional handle or actuator can be added to manually or electronically control the blade 106 separately.

When the wheel 104 and/or the blade 106 are in the second position, the wheel 104 and the blade 106 extend away from the bottom side 56 or floor 52 of the hovercraft 50 at a distance greater than or equal to the distance at which the bottom side 56 or floor 52 of the hovercraft 50 hovers above the surface over which the hovercraft travels, which allows the wheel 104 and the blade 106 to contact the surface and generate friction to facilitate and/or improve direction control of the hovercraft 50. Conversely, when the wheel 104 and/or the blade 106 are in the retracted position, the wheel 104 and/or the blade 106 extend away from the bottom side 56 or floor 52 of the hovercraft 50 at a distance less than the distance at which the bottom side 56 or floor 52 of the hovercraft 50 hovers above the surface over which the hovercraft 50 travels allowing the hovercraft 50 to hover without surface contact.

FIGS. 9-20 illustrate an alternative embodiment of a direction control device 200 having alternative characteristics to operate steering, alternative characteristics to absorb shocks and uneven terrain, and alternative characteristics to retract and extend a wheel 204 and a blade 206. Reference numerals identical to those used in FIGS. 1-8 are used in FIGS. 9-20 to reference identical features. One of skill in the art would understand that certain features shown in FIGS. 9-20 can be substituted for, or used in combination with, certain features shown in FIGS. 1-8.

Figure 9:
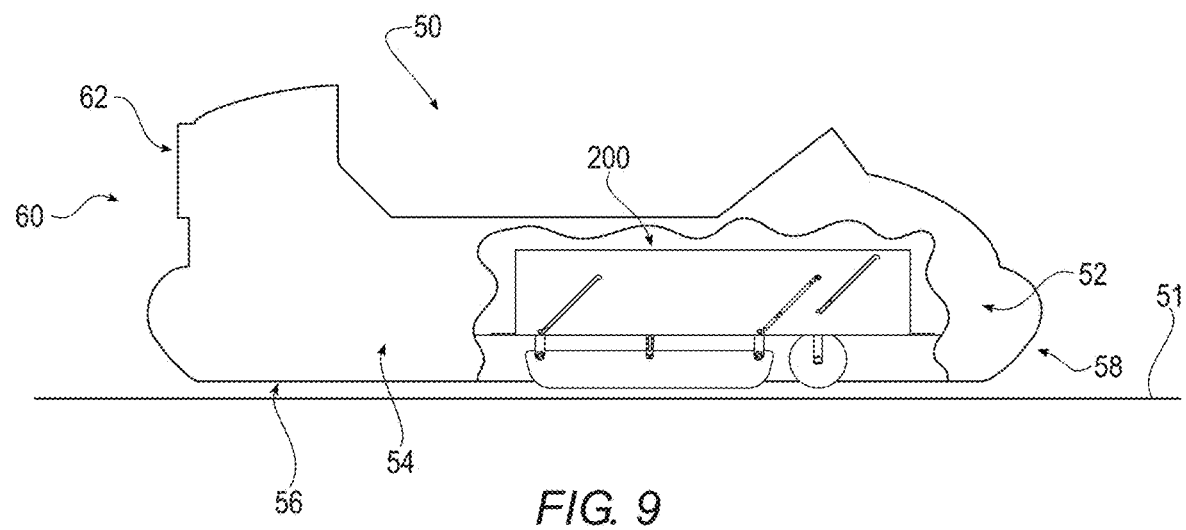
FIG. 9 shows a side view of a hovercraft partially cut away to reveal a direction control device with a wheel and a blade in a first position, according to an embodiment of the invention.
Figure 10:
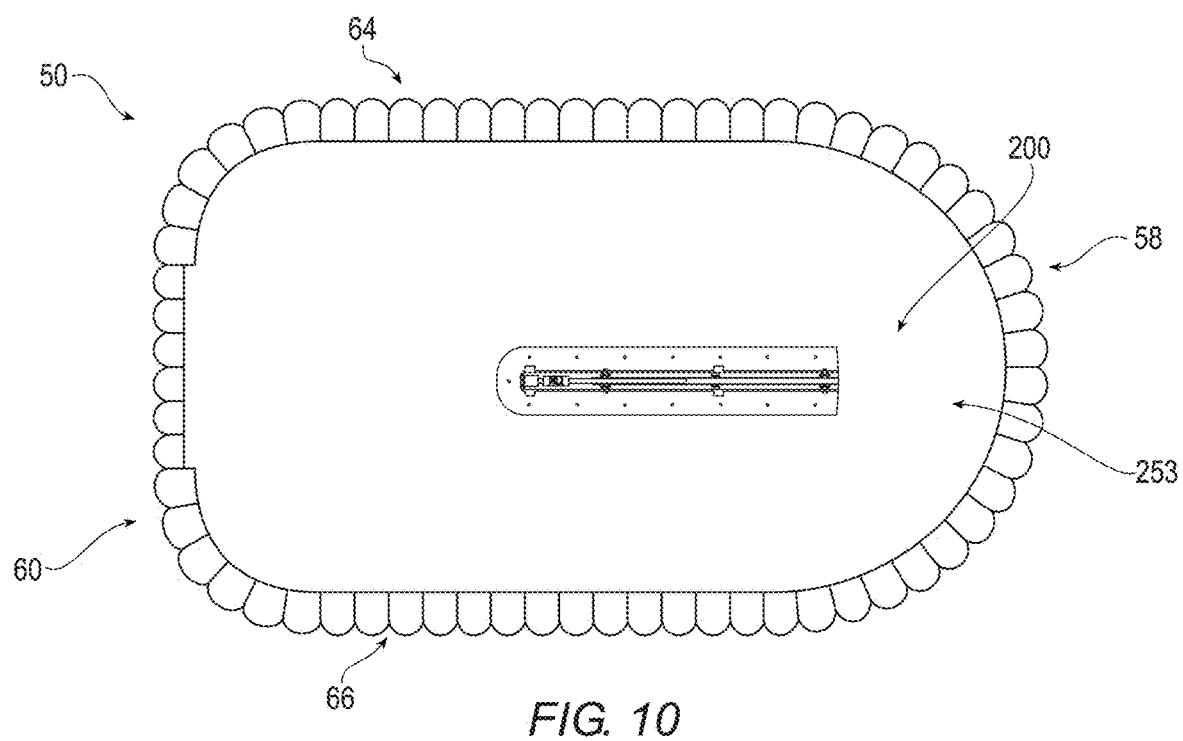
FIG. 10 shows a bottom view of the hovercraft and direction control device of FIG. 9.

FIG. 9 shows a side view of the hovercraft 50 partially cut away to reveal the direction control device 200. FIG. 10 shows a bottom view of the hovercraft 50 fitted with the direction control device 200. Referring to FIG. 9 and FIG. 10, as with the direction control device 100, the direction control device 200 can be positioned as desired between the front end 58 and the rear end 60, though with the propelling device 62 thrusting from the rear end 60, positioning the direction control device 200 toward or in the front half of the hovercraft 50 can yield greater direction control. The direction control device 200 can extend from or about from the front end 58 to or about to the middle point 70 between the front end 58 and the rear end 60. In FIG. 9, the direction control device 200 is shown longer than the direction control device 100, extending from near the front end 58 of the hovercraft 50 to beyond the middle point 70, which yields greater resistance to external rotational forces, and yields more uniform and stable control.

Figure 11:
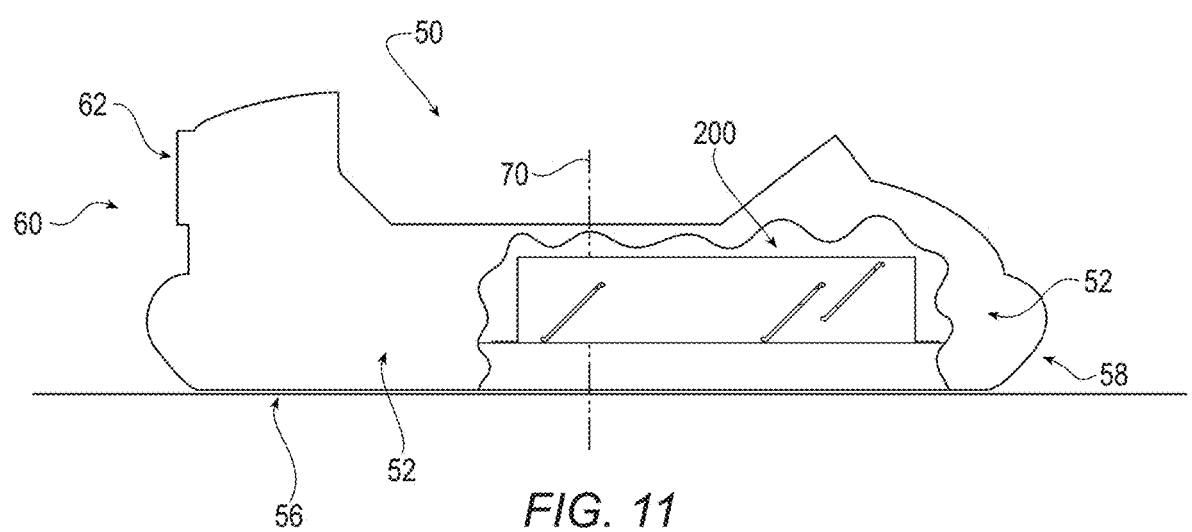
FIG. 11 shows a side view of the hovercraft of FIG. 9, the hovercraft partially cut away to reveal the direction control device of FIG. 9 with a wheel and a blade in a second position.
Figure 12:
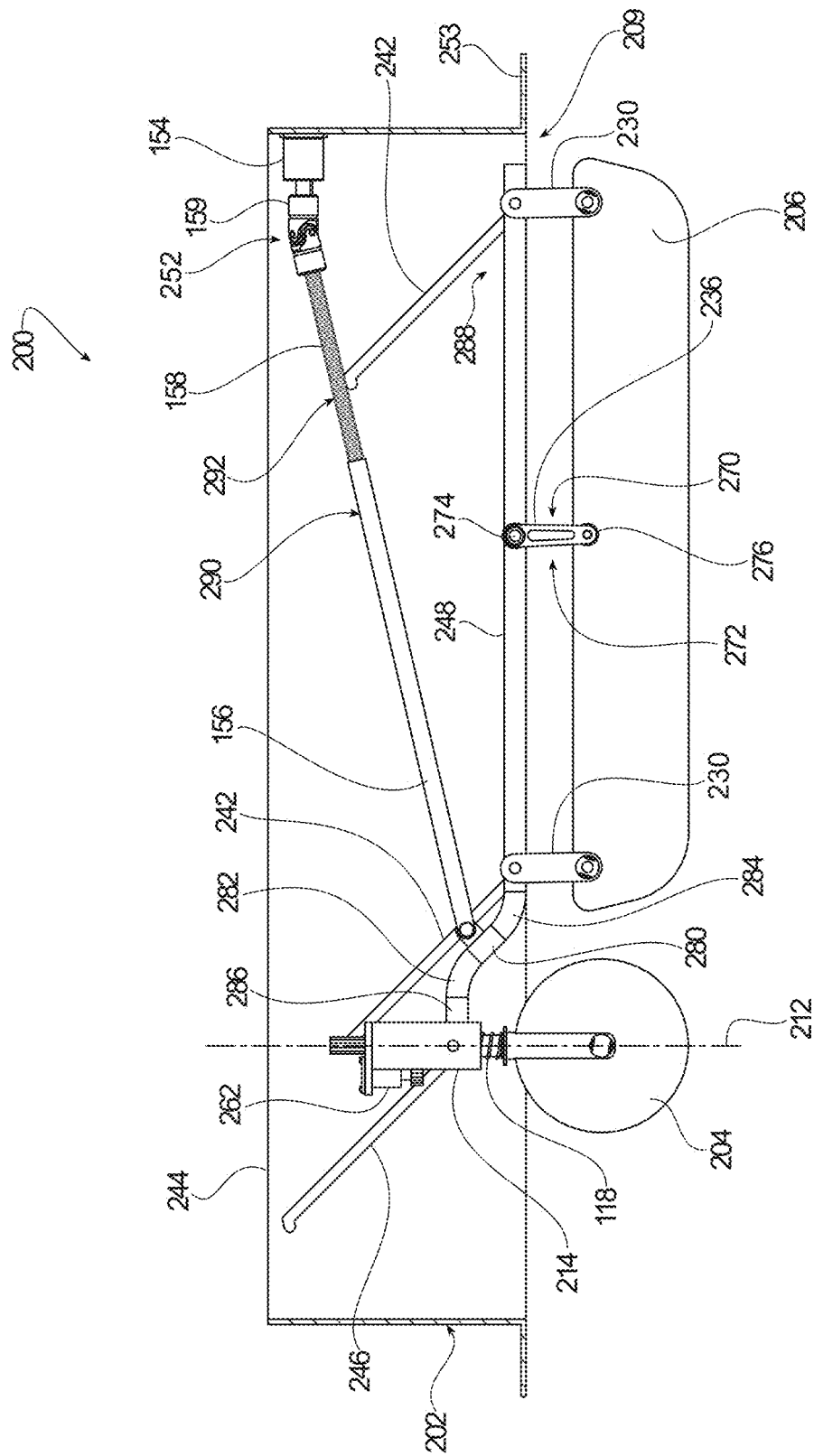
FIG. 12 shows a side view of the direction control device of FIG. 9 with the housing sectioned to reveal components within the housing.
Figure 13:
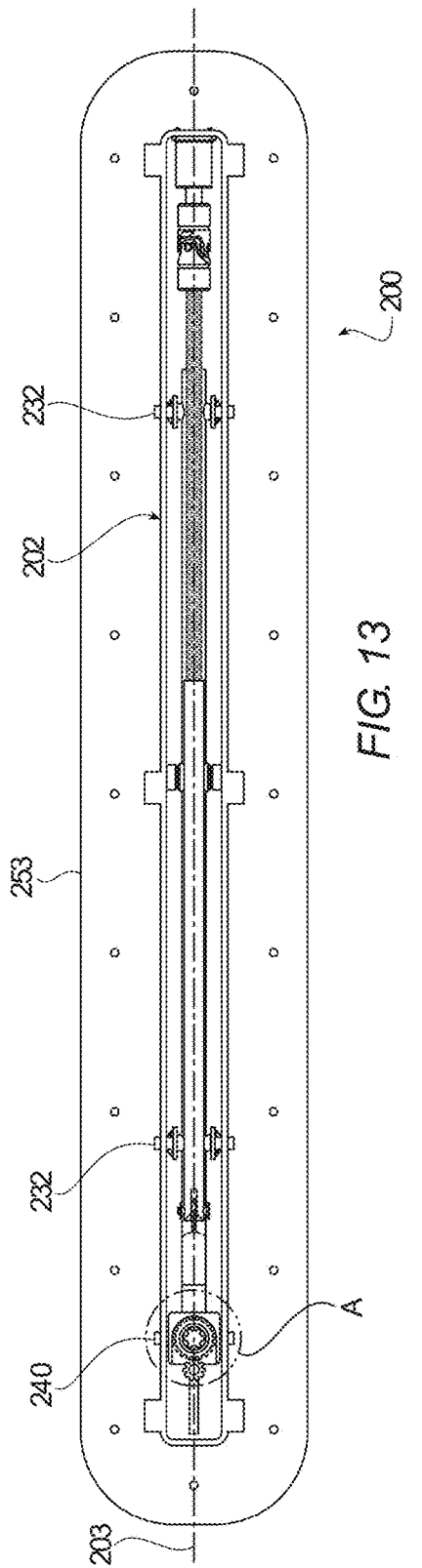
FIG. 13 shows a top view of the direction control device of FIG. 12.
Figure 18:
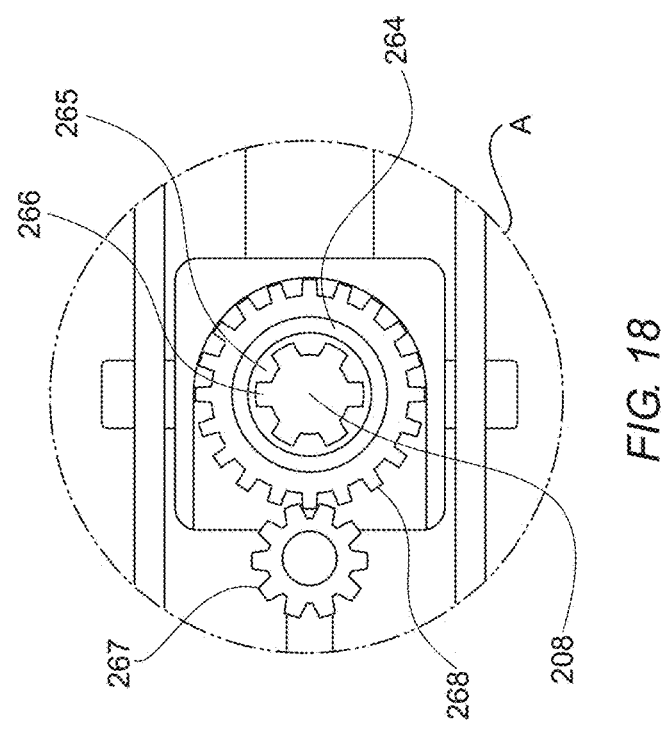
FIG. 18 is an enlarged view of detail A shown in FIG. 13.
Figure 14:
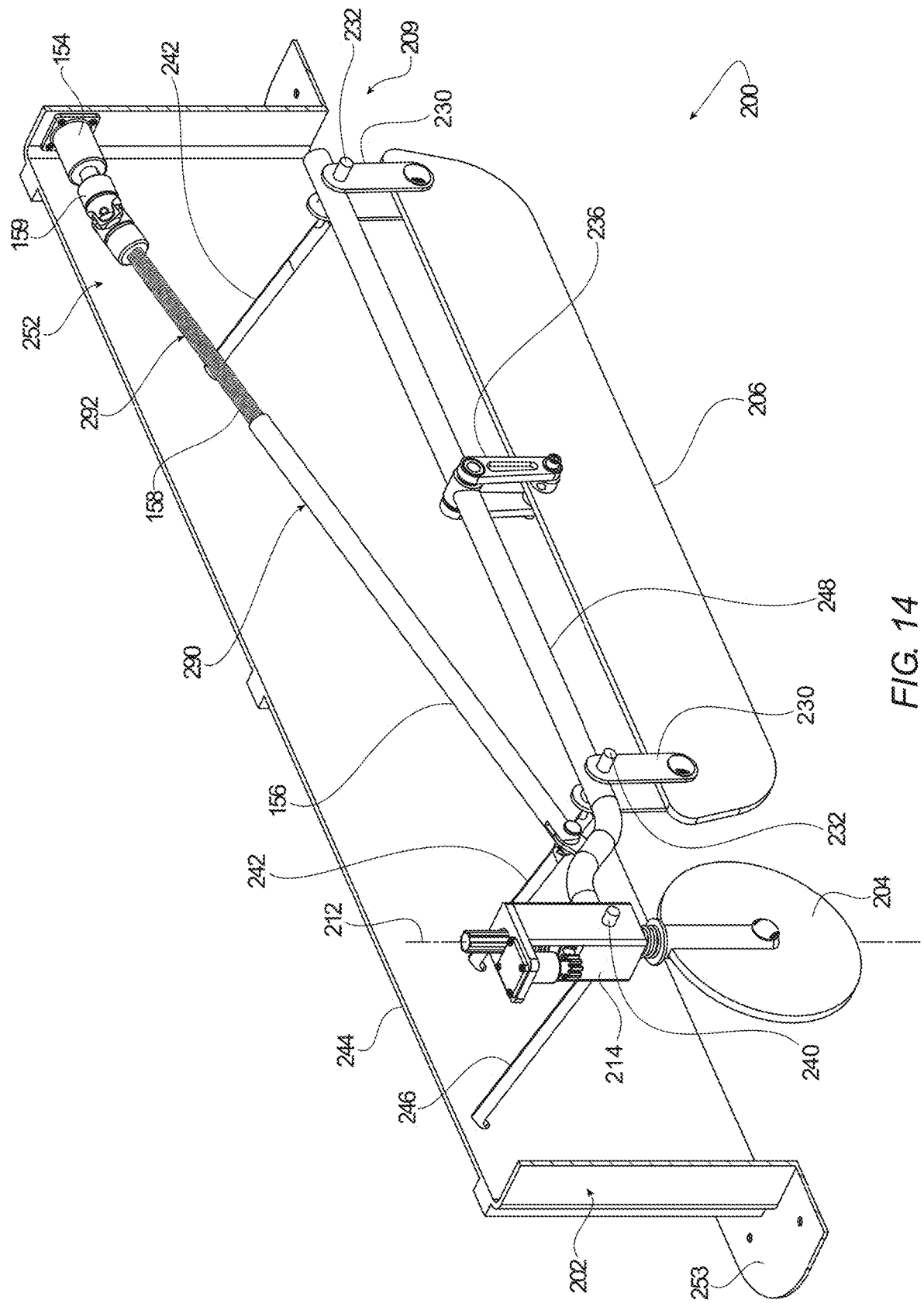
FIG. 14 shows a perspective view of the direction control device of FIG. 12 with the housing sectioned to reveal components within the housing.
Figure 15:
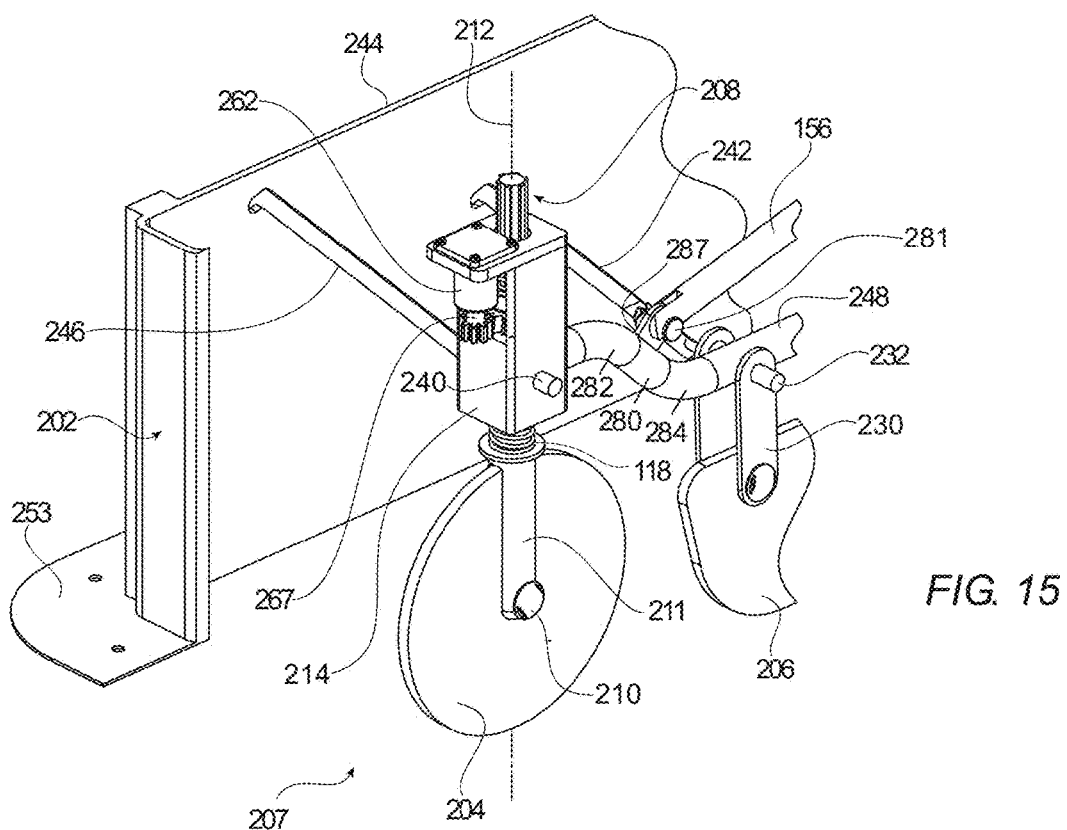
FIG. 15 is an enlarged view of a first portion of FIG. 14.
Figure 16:
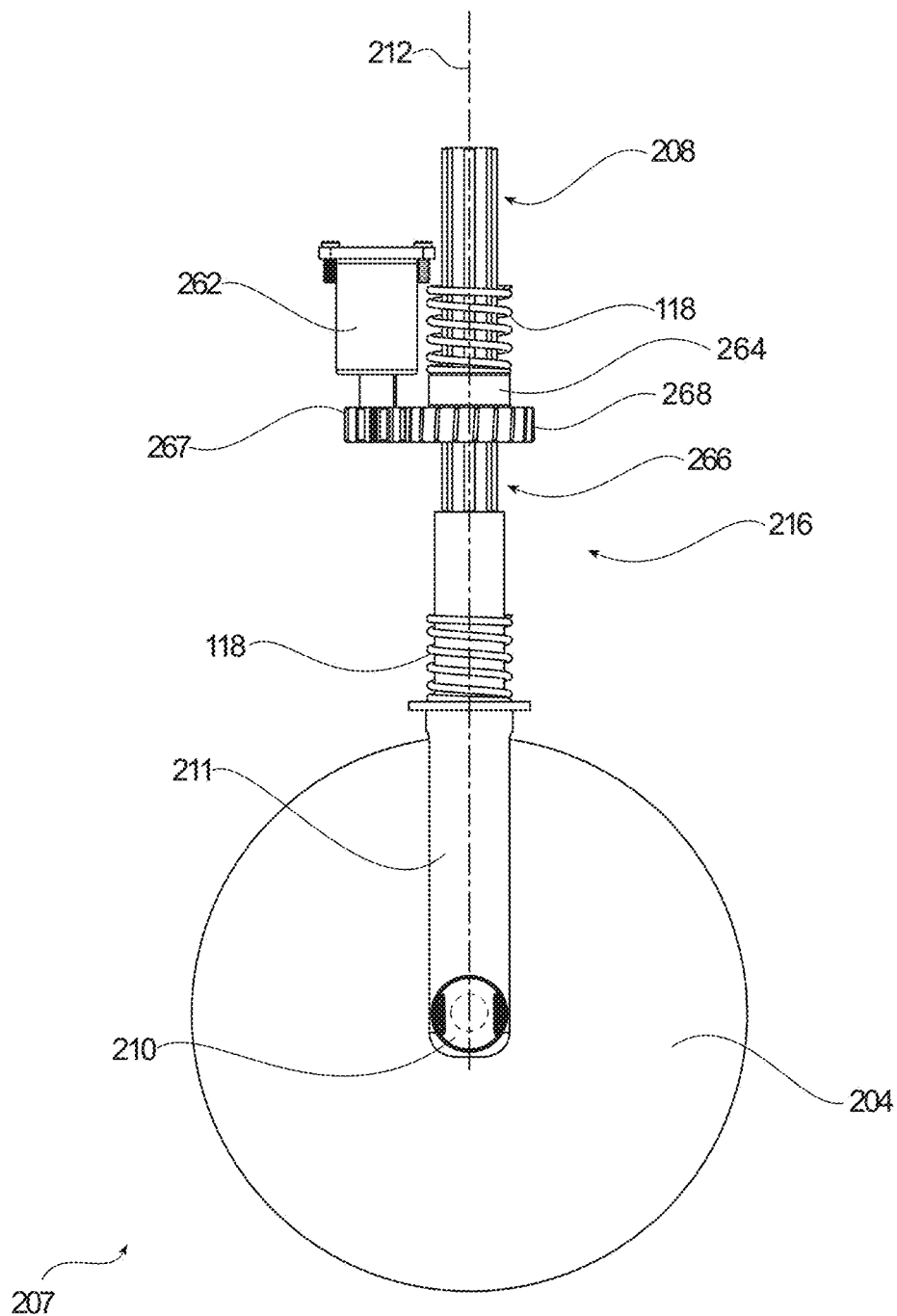
FIG. 16 shows a side view of a wheel assembly of the direction control device of FIG. 12.
Figure 17:
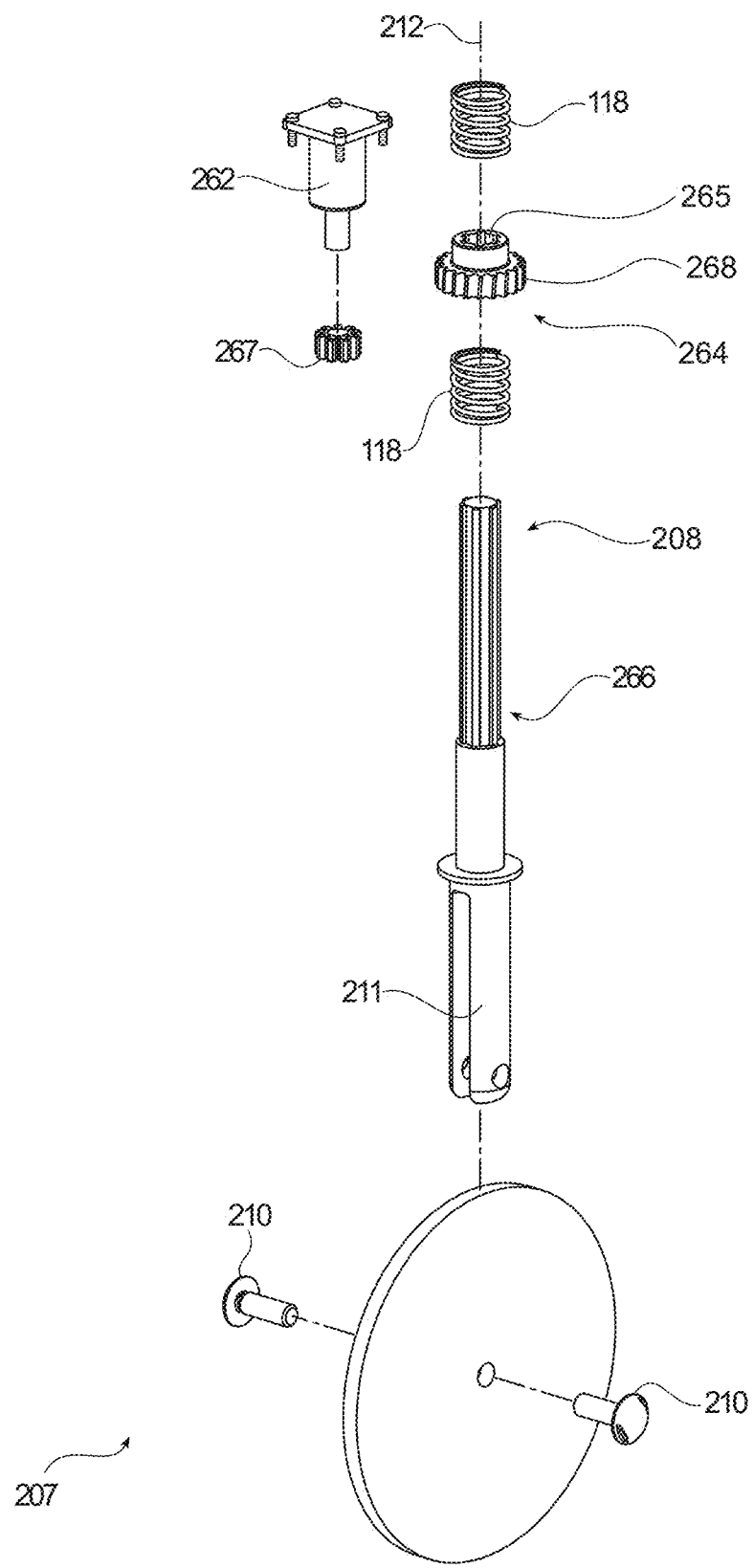
FIG. 17 shows an exploded view of the wheel assembly of FIG. 16.

The direction control device 200 includes a housing 202 to support and interconnect various other components of the direction control device 200, as well as to facilitate attaching to the hovercraft 50. The housing 202 includes a flange 253 configured to fasten, e.g., by bolting, screwing, or welding, to the floor 52 of the hovercraft 50. The flange 253 can be attached to or integral with the housing 202. The housing 202, like the housing 102, can be shaped variously, though in the illustrated embodiment, the housing 202 is elongated, with a longitudinal axis 203, to minimize its volume or footprint while accommodating configuration of the wheel 204 and the blade 206. FIG. 9 shows the wheel 204 and the blade 206 each in a first position (extended from the housing 202), while FIG. 11 shows the wheel 204 and the blade 206 each in a second position (retracted to the housing 202). A closer view of the direction control device 200, including the configuration of the wheel 204, the blade 206, and other components can be seen in FIGS. 12-20. FIG. 12 shows a side view of the direction control device 200 in the first position with the housing 202 sectioned to reveal components within the housing 202. FIG. 13 shows a top view of the direction control device 200. FIG. 14 shows a perspective view of the direction control device 200 with the wheel 204 and the blade 206 in the first position and with the housing 202 sectioned to reveal components within the housing. FIG. 15 is an enlarged view of a portion of FIG. 14 around a wheel assembly 207. FIG. 16 shows a side view of the wheel assembly 207. FIG. 17 shows an exploded view of the wheel assembly 207. FIG. 18 is an enlarged view of a portion of FIG. 13 showing the wheel assembly 207.

Referring to FIGS. 12-18, the wheel 204 can be mounted rotatably on a wheel shaft 208 configured to be extended from a first side 209 of the housing 202. An axle or bearing 210 can connect the wheel 204 to the wheel shaft 208, which can include a forked portion 211 to straddle the wheel 204 and connect to two ends of the bearing 210. The first side 209 of the housing 202 faces generally or approximately in the same direction as the bottom side 56 of the hovercraft 50. The wheel 204 is rotatable and can facilitate direction control for the hovercraft 50 in the same fashion as the wheel 104 of FIGS. 1-8. The wheel shaft 208 connects to the housing 202 in a manner such that the wheel shaft 208 can be rotated on wheel shaft axis 212, and such that the wheel shaft 208 and the wheel 204 can be rotated to further steer the hovercraft as explained with respect to the embodiment of FIGS. 1-8. To facilitate the rotation of the wheel shaft 208 relative to the housing 202, the wheel shaft 208 can extend through a sleeve 214. At least a first portion 216 of the wheel shaft 208 has an outermost diameter smaller than an innermost diameter of the sleeve 214, such that this first portion 216 can rotate within the sleeve 214.

The wheel shaft 208 differs from the wheel shaft 108 to accommodate electrically powered rotation of the wheel shaft 208 and steering of the hovercraft 50. Still referring to FIGS. 12-18, and in particular to FIGS. 16-18, a steering motor 262, such as a stepper motor, supported directly or indirectly by the housing 202 and/or the sleeve 214, drives rotation of a spline hub 264, which has inner teeth 265 engaging splines 266 extending axially (relative to the wheel shaft axis 212) on the wheel shaft 208. Rotation of the spline hub 264, through the engagement of the inner teeth 265 with the splines 266, drives rotation of the wheel shaft 208 and the wheel 204 about the wheel shaft axis 212. The spline hub 264 and the inner teeth 265 can also slide axially (relative to the wheel shaft axis 212) along the shaft 208 and the splines 266 while maintaining engagement of the inner teeth 265 with the splines 266. When the steering motor 262 is not operated to rotate the wheel 204, the engagement of the inner teeth 265 with the splines 266 can lock the wheel shaft 208 from rotating or resist rotation of the wheel shaft 208, reducing or avoiding undesired rotation of the wheel 204 caused by external forces or impacts on the wheel 204. The spline hub 264 can include outer teeth 268 and the steering motor 262 can include a gear 267 with gear teeth that engage the outer teeth 268 of the spline hub 264, and thereby drive rotation of the spline hub 264.

The steering motor 262 can be configured variously to drive the spline hub 264. For example, the spline hub 264 can alternatively be mounted directly to a rotational shaft of the steering motor 262 in axial alignment with a rotational axis of the rotational shaft of the steering motor 262. In another example, the steering motor 262 can drive a toothed belt (not shown) that engages the outer teeth 268 of the spline hub 264.

The effect of stress and impacts against the wheel 204 can be dampened by one or more shock absorption elements 118 biasing the wheel 204 toward the surface over which the hovercraft 50 travels. The shock absorption element can absorb impacts of the wheel 204 against solid surfaces, such as might be experienced travelling over uneven terrain or transitioning from a liquid to a solid surface. In the depicted embodiment, the shock absorption elements 118 include two coil springs positioned around the wheel shaft 208, though hydraulic shock absorbers or other now-known or future-developed shock absorbers can be used. The position of the two coil springs separated a distance on the wheel shaft 208 by an approximate length of the sleeve 214 facilitates balance of the wheel 204 and the wheel shaft 208.

Figure 19:
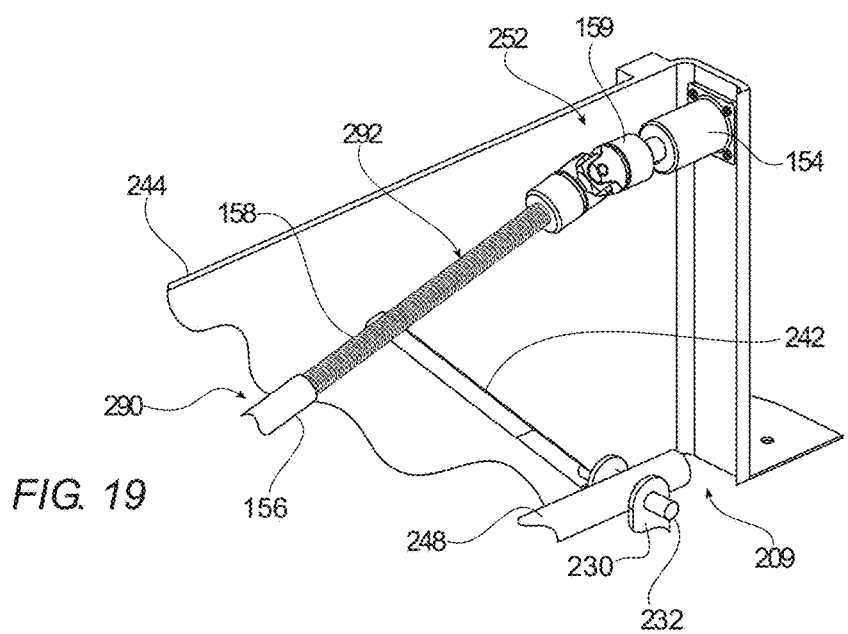
FIG. 19 is an enlarged view of a second portion of FIG. 14.

Referring to FIGS. 12-15, and further to FIG. 19, which shows an enlarged view of a portion of FIG. 13, the blade 206 is shaped similarly to the blade 106, though the blade 206 is longer in correspondence with the longer housing 202. The blade 206 operates similarly to the blade 106, though offering more surface or surface contact area to resist lateral forces on the hovercraft 50 that would cause undesired drifting or turning of the hovercraft 50.

The blade 206 is mounted on at least one blade shaft 230 that is structured and that operates similarly to the blade shaft 130 of FIG. 1-8. The suspension element 136 of FIGS. 1-8, however, is replaced with a suspension element 236 connected from the housing 202 to the blade 206. The suspension element 236 includes a first arm 270 and a second arm 272 each connected pivotably around a first pivot axis 274 and connected pivotably around a second pivot axis 276. At least one torsion spring 278 at the first pivot axis 274 biases the first arm 270 and the second arm 272 toward each other at the second pivot axis 276, such that first arm 270 and the second arm 272 pull the blade 206 to an equilibrium point. If first arm 270 pulls with an equal but opposite force as the second arm 272, then the first arm 270 and the second arm 272 will find an equilibrium point when extending approximately perpendicular with the floor 52 of the hovercraft 50. The blade 206 can rotate forward or backward toward the housing 202 when sufficient force (e.g., impact with a surface) is applied to the front, bottom, or back of the blade 206, and then return to the equilibrium position when the force is removed. The suspension element 236 can be approximately centered along the length of the blade 206 to balance support of the blade 206. The suspension element 236 could be replaced with other tensioners or other now-known or future-developed suspension structures to bias the blade 206 to an equilibrium position.

Figure 20:
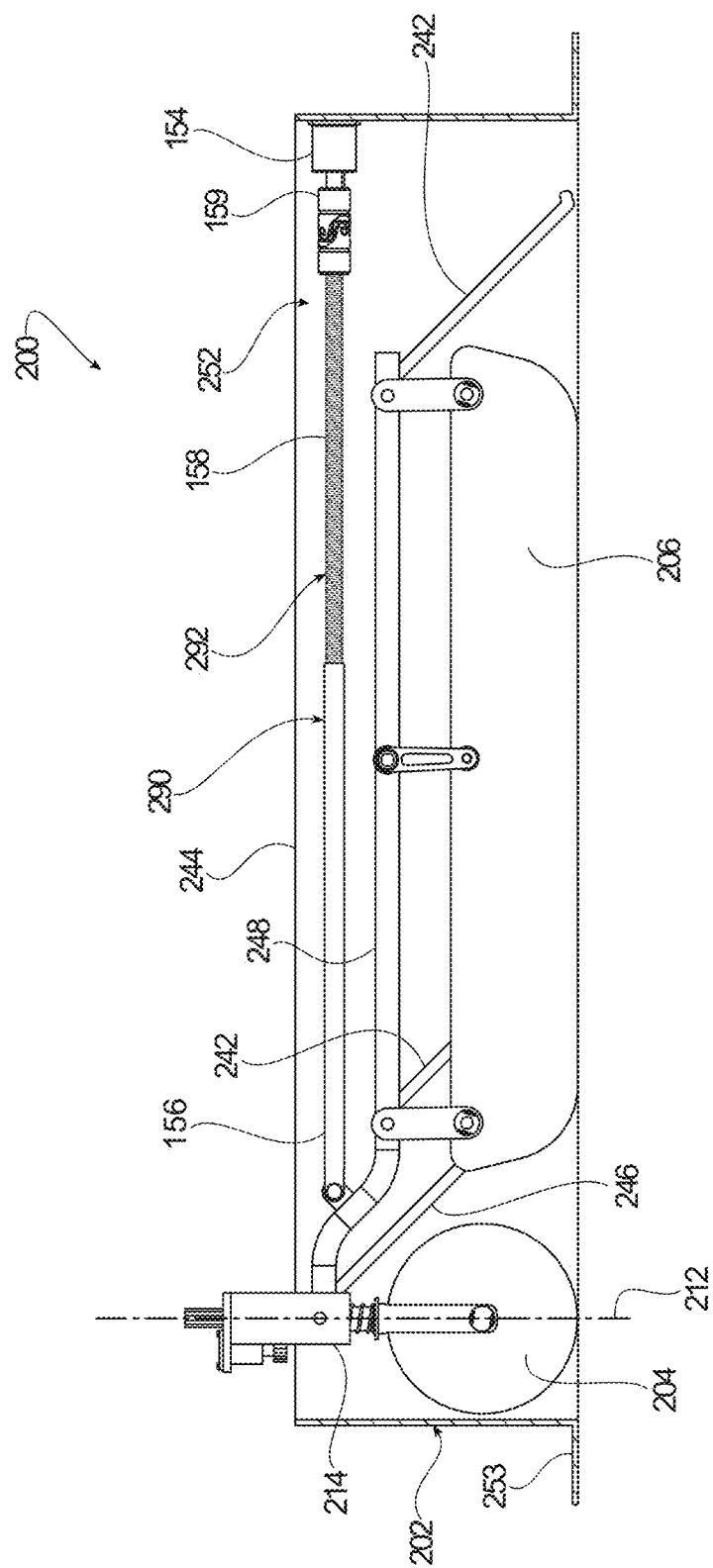
FIG. 20 shows a side view of the direction control device of FIG. 12 with the housing sectioned to reveal components within the housing, and with the wheel and the blade in a second, retracted position.

FIGS. 9, 12, 14, 15, and 19 show the direction control device 200 with the wheel 204 and the blade 206 in the first position, extended for use. By contrast, FIGS. 11 and 20 illustrate the direction control device with both the wheel 204 and the blade 206 in a second position, retracted for non-use. Such that the blade 206 can be moved between the first position and the second position, a first pin 232 pivotably connecting each respective blade shaft 230 to the housing 202 extends into a first slot 242 defined in a first lateral side 243 of the housing 202. Each first slot 242 can be mirrored on an opposing lateral side 244 of the housing 202. Each first pin 232 can be moved within the respective first slot 242 to move the blade 206 and the blade shafts 230 between the first position and the second position. Similarly, such that the wheel 204 can be moved between the first position and the second position, the wheel shaft 208 and the sleeve 214 are connected to the housing 202 by a second pin 240, which engages and slides in a second slot 246 defined in the first lateral side 243 of the housing 202. The second slot 246 can be mirrored on an opposing lateral side 244 of the housing 202.

When the wheel 204 and the blade 206 are moved into the second position, the respective second pin 240 and/or first pin 232 can be moved into a retaining portion 247 of the respective first slot 242 and second slot 246 to prevent the wheel 204 and the blade 206 from moving (i.e., falling) back into the first position. The retaining portion 247 of first slots 242 and second slots 246 can include a retaining element or characteristic, such as an inclination toward the first side 209 of the housing 202.

Referring to FIGS. 12-15, 19, and 20, each blade shaft 230, first pin 232, sleeve 214, and second pin 240 can connect indirectly to the housing 202 by connecting to a coupling element 248 that is connected directly or indirectly to the housing 202. The coupling element 248 can be a common element to which any plurality of blade shafts 130, plurality of first pins 132, the second pin 240, and the sleeve 214 connect in order to move the wheel 204 and the blade 206 in unison between the first position and the second position. The coupling element 248 can include at least one bent portion 280 between the wheel 204 and the blade 206 to accommodate the wheel 204 attaching to the coupling element 248 at a different distance from the flange 253 or the floor 52 than the blade 206 attaches to the coupling element 248. The bent portion 280 can include a first bend 282 and a second bend 284 between a first straight portion 286 where the wheel 204 attaches and a second straight portion 288 where the blade 206 attaches.

Movement of the wheel 204 and the blade 206 is driven by a linear actuator 252 and a retraction/extension motor 154 supported on the housing 202. The retraction/extension motor 154 can be a stepper motor. In the depicted embodiment, the linear actuator 252 includes a tube 156 and a shaft 158. The tube 156 has a first threaded portion 290. The shaft 158 has a second threaded portion 292 configured to threadingly engage the first threaded portion 290 of the tube 156. The tube 156 is pivotably coupled to the coupling element 248, such as with a ball joint or another pivotable joint. In the depicted embodiment, the tube 156 is connected to the bent portion 280, though the tube 156 can be connected to the coupling element 248 at another location. To connect the tube 156 and the coupling element, a pin 281 can extend through the tube 156 and the coupling element 148, or other members connected to the tube 156 and/or coupling element 148, such as member 287. The shaft 158 is connected to the retraction/extension motor 154, such as with a universal joint 159 or another joint that transmits rotation of the retraction/extension motor 154 to the shaft 158. As a result of rotation of the shaft 158, the first threaded portion 290 threads into or out of the second threaded portion 292, drawing the tube 156 toward or pushing the tube 156 away from the shaft 158. As the combined length of the shaft 158 and the tube 156 increases, the first pin 232 and the second pin 240 are pushed upward and forward in the first slots 242 and second slots 246. As the combined length of the shaft 158 and the tube 156 decreases, the first pin 232 and the second pin 240 are pulled downward and rearward in the slots 242, 246. As the first pin 232 and the second pin 240 move in the slots 242, 246, the coupling element 248, and the wheel 204 and the blade 206 attached to the coupling element 248, also move in a like direction, between the first position and the second position. Friction between threads of the first threaded portion 290 and the second threaded portion 292 provides a force to resist unintended or undesired movement between the first position and the second position, such as might otherwise be caused by impacts of the wheel 204 or blade 206 against a surface or object.

Figure 21:
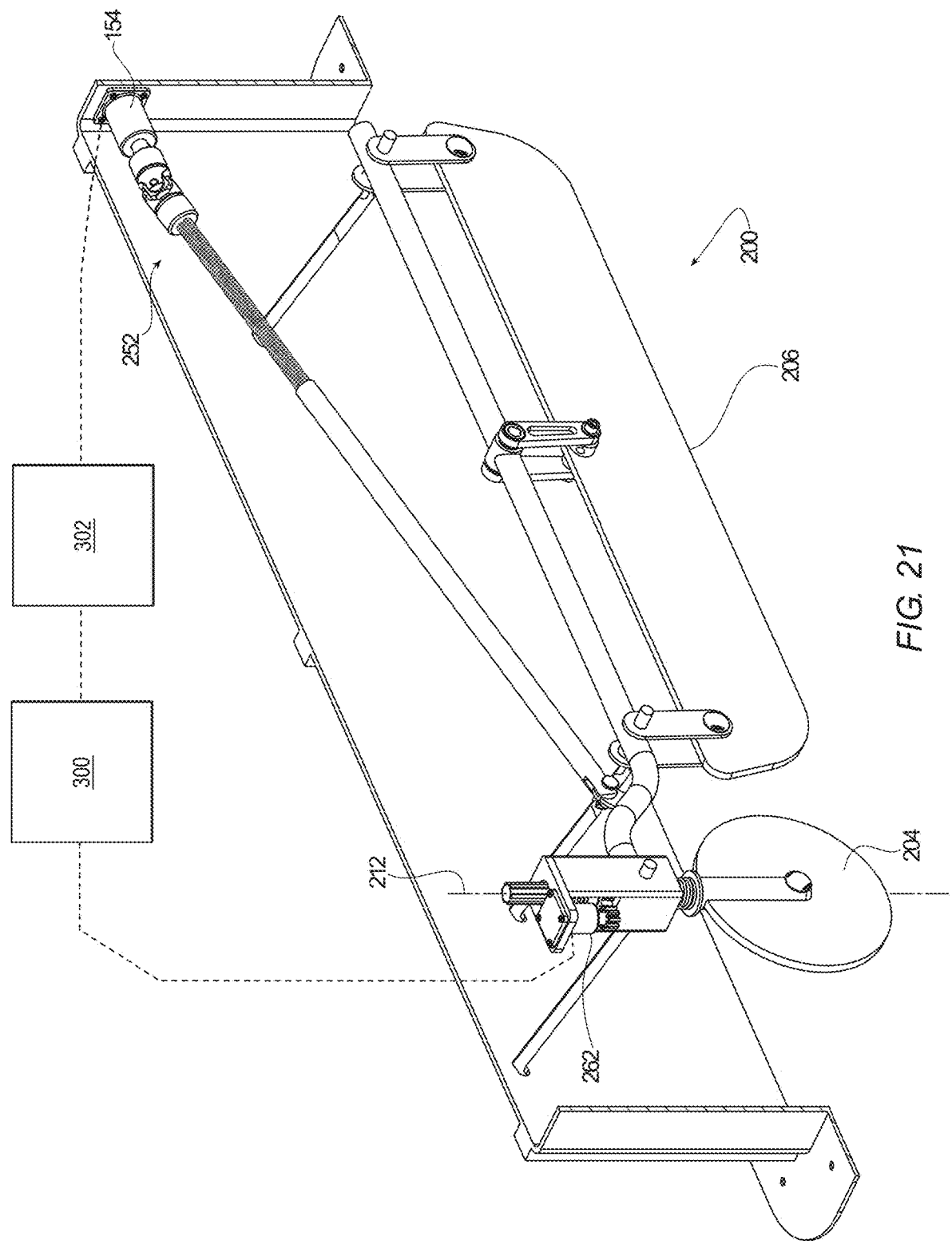
FIG. 21 shows a schematic representation of a steering control system and a retraction/extension control system for the direction control device of FIG. 12.

FIG. 21 shows a schematic representation of a steering control system 300 and a retraction/extension control system 302 for the direction control device 200. Rotation of the wheel 204 around the wheel shaft axis 212 and retraction/extension of the wheel 204 and the blade 206 can be controlled independently by the steering control system 300 communicatively coupled to the steering motor 262 and the retraction/extension control system 302 communicatively coupled to the retraction/extension motor 154. The steering control system 300 and the retraction/extension control system 302 can be configured variously by now-known or future-developed methods. The steering control system 300 and the retraction/extension control system 302 can be implemented utilizing entirely distinct and separate components, or the steering control system 300 and the retraction/extension control system 302 can overlap to various degrees utilizing some shared components. The steering control system 300 and the retraction/extension control system 302 can be wired directly to the respective steering motor 262 and the retraction/extension motor 154, or coupled by wireless signal.

Multiple wheel assemblies each including a wheel 204, a wheel shaft 208, and a steering motor 262, can be independently controlled to steer as desired. For example, two wheels 204 can be configured to orient their respective wheels 204 at opposite angles to facilitate a linearly stationary spin of the hovercraft 50, or two wheels 204 can be oriented at the same angle to increase frictional control over use of one wheel 204.

Multiple blades 206 also can be configured each with a linear actuator 252 and a retraction/extension motor 154 to dynamically control the number of blades 206 that are extended or retracted, and to gain greater or lesser friction with the underlying surface, as desired. Each blade 206 can be operated by a separate retraction/extension control system 302 or a single retraction/extension control system 302 can control the multiple blades 206. In either case, each blade 206 can be extended and retracted independently, or all the blades 206 can be extended or retracted together.

What is claimed is:

1. A direction control device comprising:
   a housing with a first side and a longitudinal axis;
   a wheel shaft supported by the housing and configured to extend beyond the first side outside the housing, the wheel shaft having a wheel shaft axis;
   a wheel having a rotational axis, the wheel supported by the wheel shaft and configured to rotate about the rotational axis;
   a blade shaft supported by the housing and configured to extend beyond the first side outside the housing; and
   a blade mounted on the blade shaft.

2. The direction control device of claim 1, wherein the blade is a flat plate elongated in a direction approximately parallel to the longitudinal axis of the elongated housing.

3. The direction control device of claim 1, wherein the wheel is a disc.

4. The direction control device of claim 1, wherein the wheel shaft has a central axis approximately perpendicular to the longitudinal axis of the elongated housing, wherein the wheel shaft is configured to rotate about the central axis.

5. The direction control device of claim 4, wherein the wheel shaft further comprises a spline, and the direction control device further comprises:
   a spline hub engaged with the spline of the wheel shaft; and
   a steering motor connected to the spline hub, the steering motor configured to drive rotation of the spline hub and rotation of the wheel shaft.

6. The direction control device of claim 5, further comprising an electronic steering control system communicatively coupled with the steering motor to control rotation of the wheel about the wheel shaft axis.

7. The direction control device of claim 5, wherein the spline hub further includes teeth engaged with the spline of the wheel shaft.

8. The direction control device of claim 5, wherein the steering motor further includes a shaft and a gear on the shaft, the gear of the steering motor engaged with the spline hub.

9. The direction control device of claim 1, further comprising a shock absorption element biasing the wheel away from the first surface of the housing when the wheel is extended outside the housing beyond the first surface, the shock absorption element configured to be resiliently deformed in a direction toward the first surface of the housing.

10. The direction control device of claim 9, wherein the shock absorption element includes a first spring biased to move the wheel towards the first side of the elongated housing when the wheel is extended outside the housing beyond the first surface.

11. The direction control device of claim 10, wherein the shock absorption element includes a second spring biased to move the wheel away from the first side of the elongated housing when the wheel is extended outside the housing beyond the first surface.

12. The direction control device of claim 1, further comprising a suspension element supported by the housing, the suspension element biasing the blade away from the first surface of the housing when the wheel is extended outside the housing beyond the first surface, the suspension element configured to be resiliently deformed.

13. The direction control device of claim 12, wherein the suspension element includes a first spring and a second spring, each of the first spring and the second spring connected to the housing and the blade, the first spring biased to pull the blade in a first direction, the second spring biased to pull the blade in a second direction, the first direction opposing the second direction.

14. The direction control device of claim 12, wherein the suspension element includes a torsion bar connected between the housing and the blade.

15. The direction control device of claim 1, wherein the wheel and the blade are each configured to be movable between a first position and a second position, such that in the first position the wheel and the blade extend beyond the first side a first distance and in the second position the wheel and the blade are retracted from the first position toward the housing.

16. The direction control device of claim 1, further comprising a coupling element connected to the housing, each blade shaft and the wheel shaft being connected to the coupling element.

17. The direction control device of claim 16, wherein the coupling element includes a bent portion and a first straight portion, the bent portion being between the wheel shaft and the blade shaft.

18. The direction control device of claim 1, further comprising a handle coupled to the wheel shaft and the blade shaft to manually move the wheel and the blade between the first position and the second position.

19. The direction control device of claim 1, further comprising:
   an actuator motor supported by the housing;
   an actuator connected between the actuator motor and at least one of the wheel shaft and the blade shaft, the actuator motor configured to be operated to move at least one of the wheel and the blade between a first position and a second position, the first position having the at least one of the wheel and the blade extended beyond the first surface outside the housing, the second position being retracted toward the housing from the first position.

20. The direction control device of claim 19, further comprising an electronic extension/retraction control system communicatively coupled with the actuator motor to control movement of at least one of the wheel and the blade between the first position and the second position.

21. The direction control device of claim 19, wherein the actuator comprises:

a shaft having a first threaded portion and a shaft axis;

a tube having a second threaded portion at a first end, the tube having a second end opposite the first end, the first threaded portion threadingly engaged with the second threaded portion, the second end connected to at least one of the wheel shaft and the blade shaft, the actuator motor configured to rotate the shaft about the shaft axis to thread the tube toward and away from the shaft, to move the at least one of the wheel and the blade between the first position and the second position.

22. The direction control device of claim 1, further comprising:

an electronic extension/retraction control system communicatively coupled with the extension/retraction motor to control movement of at least one of the blade and the wheel between the first position and the second position.

23. The direction control device of claim 1, further comprising:

a side wall extending from the first side, the side wall having a first slot and a second slot;

a first pin connected to the wheel shaft and slidably engaged in the first slot;

a second pin connected to the blade shaft and slidably engaged in the second slot.

24. The direction control device of claim 23, further comprising:

a third pin slidably engaged in a third slot of the side wall;

a second blade shaft extending from the first side and connected to the third pin and the blade;

a spring connection pin mounted on the blade and positioned between the first blade shaft and the second blade shaft;

a first suspension spring connected between the second pin and the spring connection pin, a second suspension spring connected between the third pin and the spring connection pin.

25. The direction control device of claim 24, wherein the first blade shaft is pivotably connected to the blade and the second pin, and the second blade shaft is pivotably connected to the blade and the third pin.

26. The direction control device of claim 24, wherein the first suspension spring is pivotably connected to the second pin and the spring connection pin, and the second suspension spring is pivotably connected to the third pin and the spring connection pin.

27. The direction control device of claim 24, further comprising a flange extending from approximately the first surface.

28. A hovercraft comprising:

a bottom wall with a central longitudinal axis;

a passenger side to a first side of the bottom wall;

a wheel shaft configured to extend from the bottom wall to a second side of the bottom wall opposite the passenger side, and configured to retract through the bottom wall to the passenger side;

a wheel rotatably mounted on the wheel shaft;

a blade shaft configured to extend from the bottom wall to the second side of the bottom wall and configured to retract through the bottom wall to the passenger side; and a blade mounted on the blade shaft.

29. The hovercraft of claim 28, further comprising a housing supporting the wheel shaft and the blade shaft, the housing including a flange configured to be mounted to the bottom wall of the hovercraft.

30. The hovercraft of claim 28, further comprising a propelling device that thrusts at a first variable angle, and wherein the wheel is configured to pivot at a second variable angle approximately equal to the first variable angle.

31. The hovercraft of claim 28, wherein the hovercraft is configured to hover above a surface at a hover height, the hover height being the distance between the surface and the bottom wall, and wherein the wheel and the blade are each configured to be movable between a first position and a second position, such that in the first position the wheel and the blade extend away from the bottom wall at a distance equal to or greater than the hover height, and in the second position the wheel and the blade extend from the bottom wall at a distance less than the hover height.

* * * * *